US012613006B2

(12) United States Patent
Takase et al.

(10) Patent No.: US 12,613,006 B2
(45) Date of Patent: Apr. 28, 2026

(54) EQUIPMENT MAINTENANCE METHOD AND LIQUEFIED HYDROGEN SYSTEM

(71) Applicant: KAWASAKI JUKOGYO KABUSHIKI KAISHA, Kobe (JP)

(72) Inventors: Tomonori Takase, Kobe (JP); Takashi Yamada, Kobe (JP); Atsushi Maeda, Kobe (JP); Kyohei Takeshita, Kobe (JP); Seiji Yamashita, Kobe (JP); Yasunobu Nomoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 16 days.

(21) Appl. No.: 18/848,643

(22) PCT Filed: Mar. 22, 2023

(86) PCT No.: PCT/JP2023/011248
§ 371 (c)(1),
(2) Date: Sep. 19, 2024

(87) PCT Pub. No.: WO2023/189948
PCT Pub. Date: Oct. 5, 2023

(65) Prior Publication Data

US 2025/0207731 A1 Jun. 26, 2025

(30) Foreign Application Priority Data

Mar. 28, 2022 (JP) ................................ 2022-051696

(51) Int. Cl.
*F17C 9/00* (2006.01)
*F17C 13/04* (2006.01)

(52) U.S. Cl.
CPC ................ *F17C 9/00* (2013.01); *F17C 13/04* (2013.01); *F17C 2205/0323* (2013.01);
(Continued)

(58) Field of Classification Search
CPC .... F17C 9/00; F17C 13/04; F17C 2205/0323; F17C 2221/012; F17C 2221/014;
(Continued)

(56) References Cited

U.S. PATENT DOCUMENTS

2005/0000802 A1 * 1/2005 Hobbs ...................... F17C 9/04
205/637
2023/0160537 A1 * 5/2023 Light .................... F17C 13/006
62/45.1

FOREIGN PATENT DOCUMENTS

JP 5495713 B2 5/2014
WO WO-2016052374 A1 * 4/2016 .............. F17C 13/00

OTHER PUBLICATIONS

WO-2016052374-A1—English Translation (Year: 2016).*

* cited by examiner

*Primary Examiner* — Christopher M Afful
(74) *Attorney, Agent, or Firm* — Oliff PLC

(57) ABSTRACT

An equipment maintenance method that allows prevention of nitrogen gas from solidifying is provided when separating the equipment from a flow path for liquefied hydrogen. In the equipment maintenance method, an operator allows hydrogen gas to flow into a first section, a second section, a third section, and a fourth section, and discharges liquefied hydrogen. Thereafter, the operator allows the nitrogen gas to flow into the second section and the third section, and discharges the hydrogen gas. With the second section and the third section filled with the nitrogen gas, the operator decouples the flow path at a first joint part and a second joint part, and detaches the pump.

14 Claims, 8 Drawing Sheets

(52) U.S. Cl.
CPC .. *F17C 2221/012* (2013.01); *F17C 2221/014* (2013.01); *F17C 2223/0153* (2013.01); *F17C 2227/044* (2013.01); *F17C 2250/043* (2013.01); *F17C 2250/0439* (2013.01); *F17C 2260/015* (2013.01)

(58) Field of Classification Search
CPC ........ F17C 2223/0153; F17C 2227/044; F17C 2250/043; F17C 2250/0439; F17C 2260/015
USPC .............................................................. 141/4
See application file for complete search history.

EQUIPMENT MAINTENANCE METHOD AND LIQUEFIED HYDROGEN SYSTEM

TECHNICAL FIELD

The present disclosure relates to a maintenance method of equipment that handles liquefied hydrogen.

BACKGROUND ART

As a technology to handle liquefied gas at low temperatures, Patent Literature 1 discloses a method of shipping LNG from an LNG receiving terminal tank and a device for this purpose.

In the technology, a lorry is connected to the LNG receiving terminal via a flexible hose. When the LNG loading operation from the LNG receiving terminal to the lorry is completed, nitrogen gas flows from a nitrogen gas supply facility into the flexible hose, thereby purging the LNG remaining in the flexible hose and disconnecting the lorry from the LNG receiving terminal.

CITATION LIST

Patent Literature

Patent Literature 1: JP 5495713 B2

In the technology described in Patent Literature 1, nitrogen gas is used to perform purge when the lorry is disconnected from the LNG receiving terminal, but if such purge technology is applied to equipment that handles liquefied hydrogen, there is a possibility that nitrogen may solidify when exposed to the cold energy of liquefied hydrogen.

SUMMARY OF INVENTION

An object of the present disclosure is to provide a maintenance method of equipment capable of preventing nitrogen gas from solidifying when the equipment is separated from a flow path of liquefied hydrogen.

An equipment maintenance method according to one aspect of the present disclosure is an equipment maintenance method in a flow path having a first valve, a second valve, equipment, a third valve, and a fourth valve disposed in order along a direction in which liquefied hydrogen flows, and includes: filling hydrogen gas between the first valve and the fourth valve in the flow path; filling nitrogen gas between the second valve and the third valve in the flow path from a state where the hydrogen gas is filled between the first valve and the fourth valve in the flow path; and decoupling and sealing the flow path between the second valve and the equipment and between the third valve and the equipment, and separating the equipment from the flow path with the nitrogen gas filled between the second valve and the third valve in the flow path.

The present disclosure provides a maintenance method of equipment capable of preventing nitrogen gas from solidifying when the equipment is separated from a flow path of liquefied hydrogen.

DESCRIPTION OF EMBODIMENTS

An embodiment of an equipment maintenance method according to the present disclosure will be described in detail below with reference to the drawings. The equipment according to the present disclosure is a member or device that handles liquefied hydrogen. In the following embodiment, a description will be given based on an example in which a pump is used as the equipment.

Figure 1:
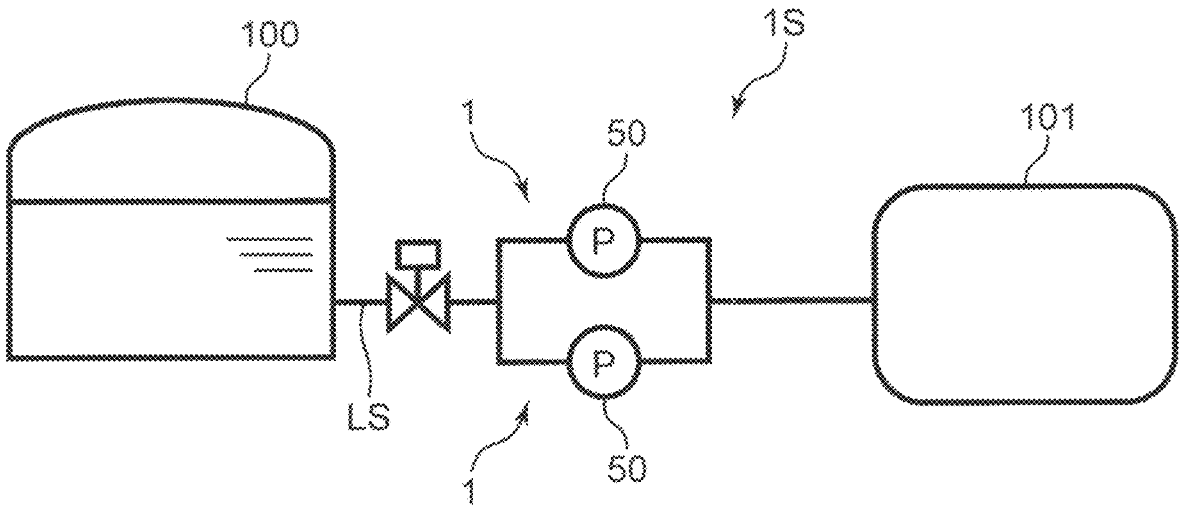
FIG. 1 is an overall schematic diagram of a liquefied hydrogen system that is the subject of the present disclosure.

FIG. 1 is an overall schematic diagram of a liquefied hydrogen system 1S that is the subject of the present disclosure. The liquefied hydrogen system 1S includes a liquefied hydrogen tank 100, a hydrogen utilization facility 101, and a plurality of pumps 50. The liquefied hydrogen tank 100, the hydrogen utilization facility 101, and the plurality of pumps 50 are connected by a flow path LS.

The liquefied hydrogen tank 100 is a tank that can store liquefied hydrogen, and is disposed on land. As one example, the liquefied hydrogen tank 100 is a ground-mounted flat-bottom tank. The hydrogen utilization facility 101 is a facility that utilizes the liquefied hydrogen stored in the liquefied hydrogen tank 100. As one example, the hydrogen utilization facility 101 includes a lorry that transports liquefied hydrogen. The plurality of pumps 50 has a function of sending the liquefied hydrogen stored in the liquefied hydrogen tank 100 to the hydrogen utilization facility 101. Note that as shown in FIG. 1, in the present embodiment, the plurality of pumps 50 is arranged in parallel.

The liquefied hydrogen system 1S further includes two attachment and detachment mechanisms 1. Each of the attachment and detachment mechanisms 1 separates a part including the pump 50 from the flow path LS when performing maintenance on the pump 50.

Figure 2:
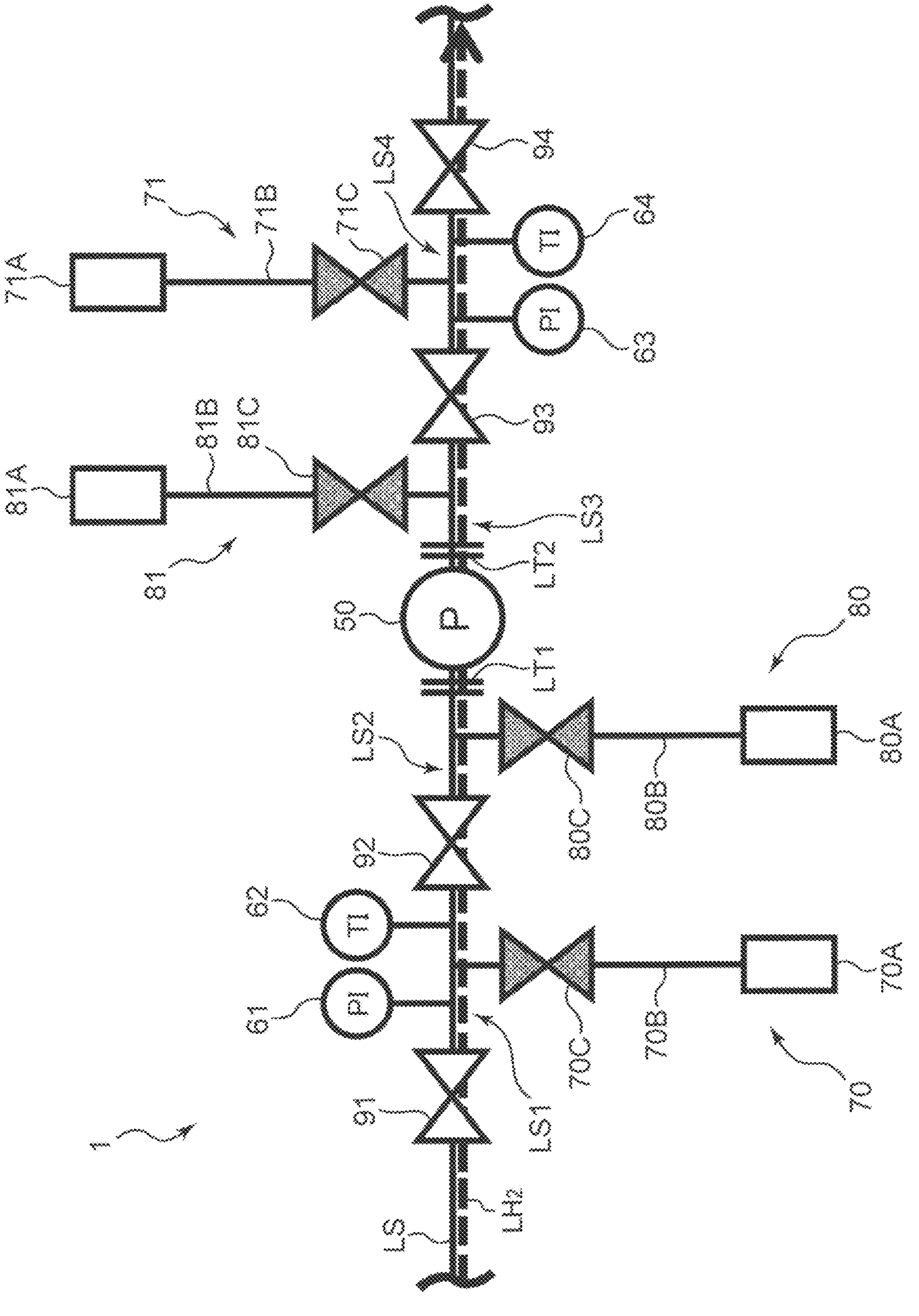
FIG. 2 is an enlarged schematic diagram of the liquefied hydrogen system according to one embodiment of the present disclosure, showing how liquefied hydrogen flows through a flow path.

Next, the configuration and function of the attachment and detachment mechanism 1 will be described in detail, taking the periphery of one of the pumps 50 in FIG. 1 as an example. FIG. 2 is an enlarged schematic diagram of the liquefied hydrogen system 1S according to the present embodiment, showing how liquefied hydrogen flows through the flow path LS.

The attachment and detachment mechanism 1 includes a first valve 91, a second valve 92, a third valve 93 and a fourth valve 94.

The first valve 91, the second valve 92, the third valve 93, and the fourth valve 94 are disposed in order from the liquefied hydrogen tank 100 side. Each valve opens and closes a part of the flow path LS. The pump 50 is disposed between the second valve 92 and the third valve 93.

Hereinafter, in the flow path LS, a section between the first valve 91 and the second valve 92 is referred to as a first section LS1, a section between the second valve 92 and the pump 50 is referred to as a second section LS2, a section between the pump 50 and the third valve 93 is referred to as a third section LS3, and a section between the third valve 93 and the fourth valve 94 is referred to as a fourth section LS4.

The attachment and detachment mechanism 1 further includes a hydrogen supply and discharge unit 70, a hydrogen supply and discharge unit 71, a nitrogen supply unit 80, and a nitrogen discharge unit 81.

Each supply and discharge unit supplies gas to the flow path LS and discharges gas from the flow path LS. Specifically, the hydrogen supply and discharge unit 70 communicates with the first section LS1 and supplies hydrogen gas to the flow path LS. In addition, the hydrogen supply and discharge unit 70 discharges hydrogen gas from the first section LS1. The hydrogen supply and discharge unit 70 includes a hydrogen gas tank 70A, a flow path 70B, and a hydrogen valve 70C. The hydrogen gas tank 70A stores hydrogen gas. The flow path 70B communicates the hydrogen gas tank 70A with the first section LS1. The hydrogen valve 70C opens and closes the flow path 70B.

The hydrogen supply and discharge unit 71 communicates with the fourth section LS4 and supplies hydrogen gas to the flow path LS. In addition, the hydrogen supply and discharge unit 71 discharges hydrogen gas from the fourth section LS4. The hydrogen supply and discharge unit 71 includes a hydrogen gas tank 71A, a flow path 71B, and a hydrogen valve 71C. The structure and function of these members are similar to those of members of the hydrogen supply and discharge unit 70.

The nitrogen supply unit 80 communicates with the second section LS2 of the flow path LS. In particular, the nitrogen supply unit 80 directly communicates with the second section LS2 without going through the first section LS1, and supplies nitrogen gas to the flow path LS. The nitrogen supply unit 80 includes a nitrogen gas tank 80A, a flow path 80B, and a nitrogen valve 80C. The nitrogen gas tank 80A stores nitrogen gas. The flow path 80B communicates the nitrogen gas tank 80A with the second section LS2. The nitrogen valve 80C opens and closes the flow path 80B.

The nitrogen discharge unit 81 communicates with the third section LS3 of the flow path LS, and discharges nitrogen gas from the flow path LS. The nitrogen discharge unit 81 includes a nitrogen gas tank 81A, a flow path 81B, and a nitrogen valve 81C. The nitrogen gas tank 81A stores nitrogen gas. The flow path 81B communicates the nitrogen gas tank 81A with the third section LS3. The nitrogen valve 81C opens and closes the flow path 81B.

The attachment and detachment mechanism 1 further includes a pressure gauge 61, a thermometer 62, a pressure gauge 63, and a thermometer 64. The pressure gauge 61 detects the pressure in the first section LS1, whereas the thermometer 62 detects the temperature in the first section LS1. Similarly, the pressure gauge 63 detects the pressure in the fourth section LS4, whereas the thermometer 64 detects the temperature in the fourth section LS4.

The attachment and detachment mechanism 1 further includes a first joint part LT1 and a second joint part LT. By the first joint part LT1 and the second joint part LT2, the pump 50 can be attached to and detached from the flow path LS. In the present embodiment, the first joint part LT1 and the second joint part LT2 have a bayonet joint structure. Note that arbitrary joint structure, such as a flange joint, can be adopted for the first joint part LT1 and the second joint part LT2.

Figure 3:
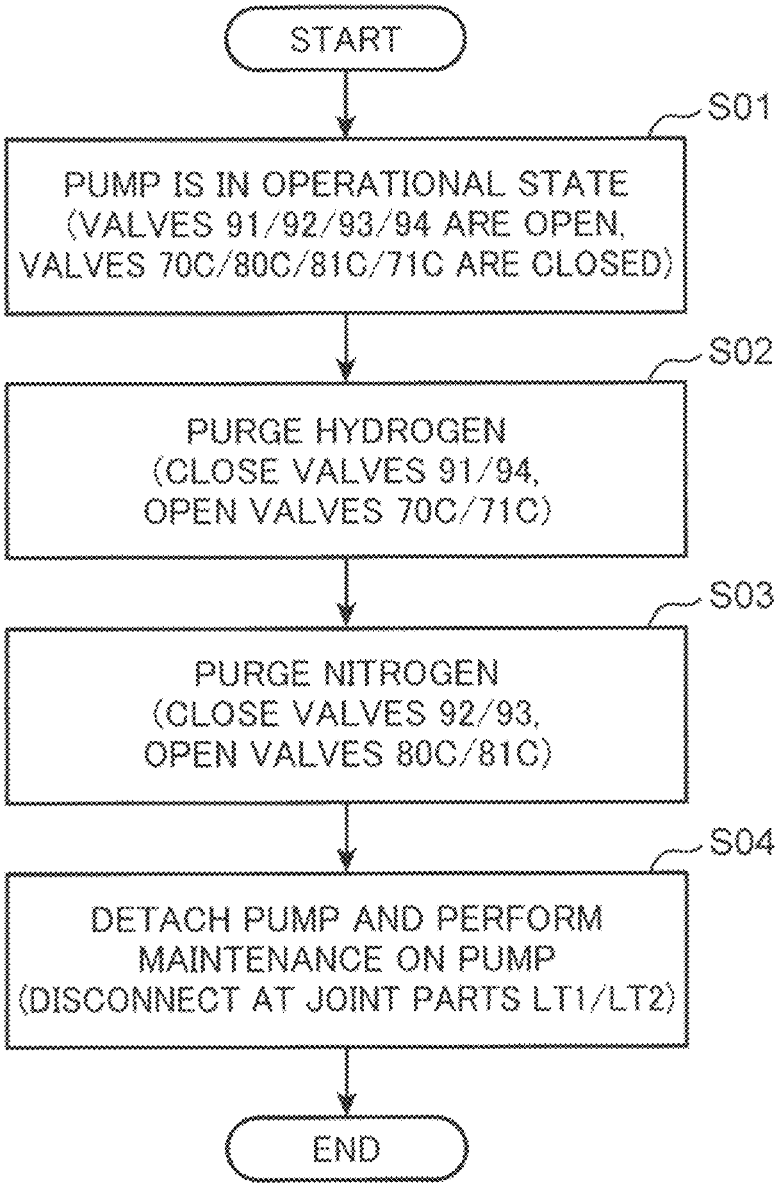
FIG. 3 is a flowchart of an equipment maintenance method according to one embodiment of the present disclosure.
Figure 4:
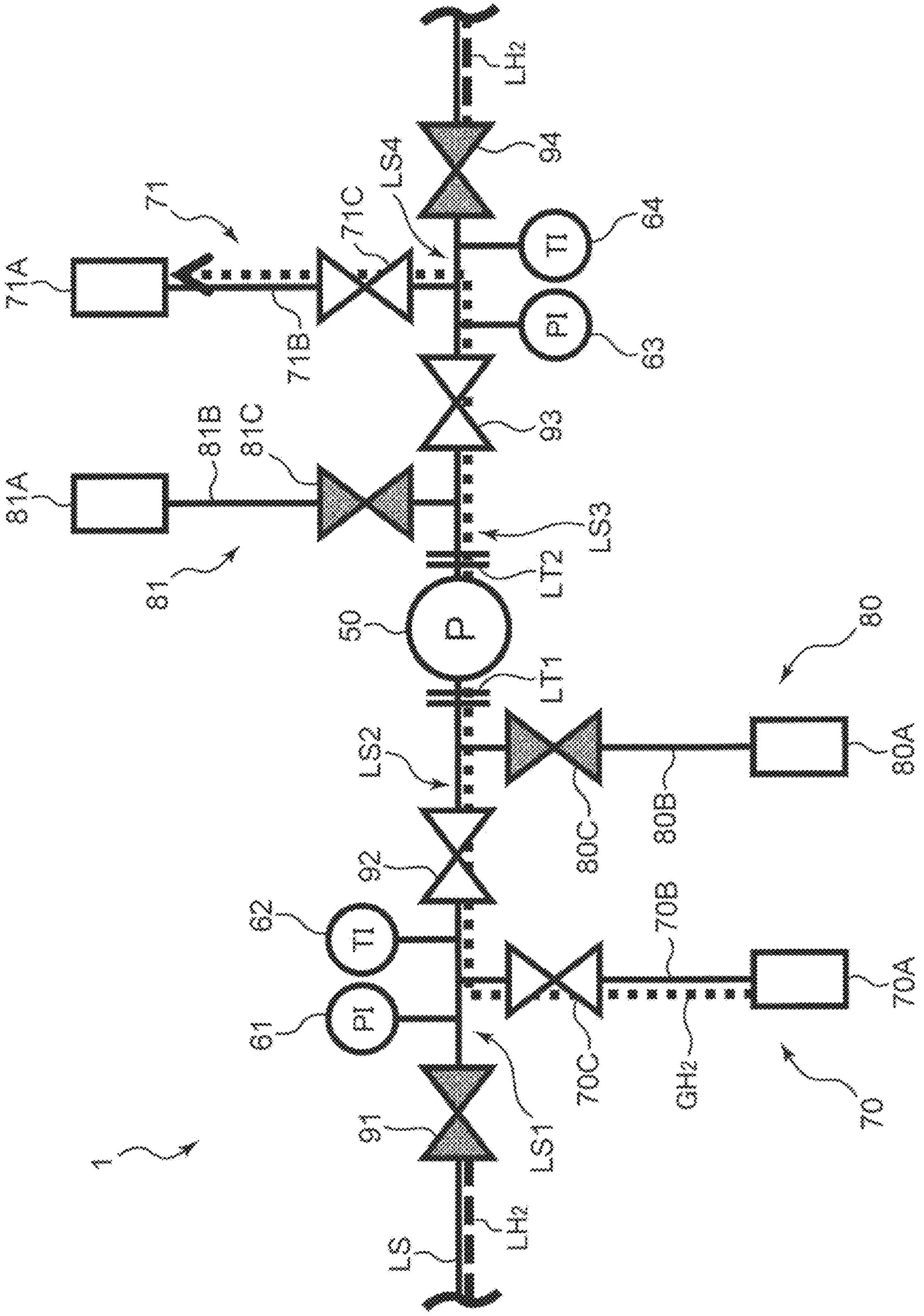
FIG. 4 is an enlarged schematic diagram of the liquefied hydrogen system according to one embodiment of the present disclosure, showing a state in which a part of the flow path is replaced with hydrogen gas.
Figure 5:
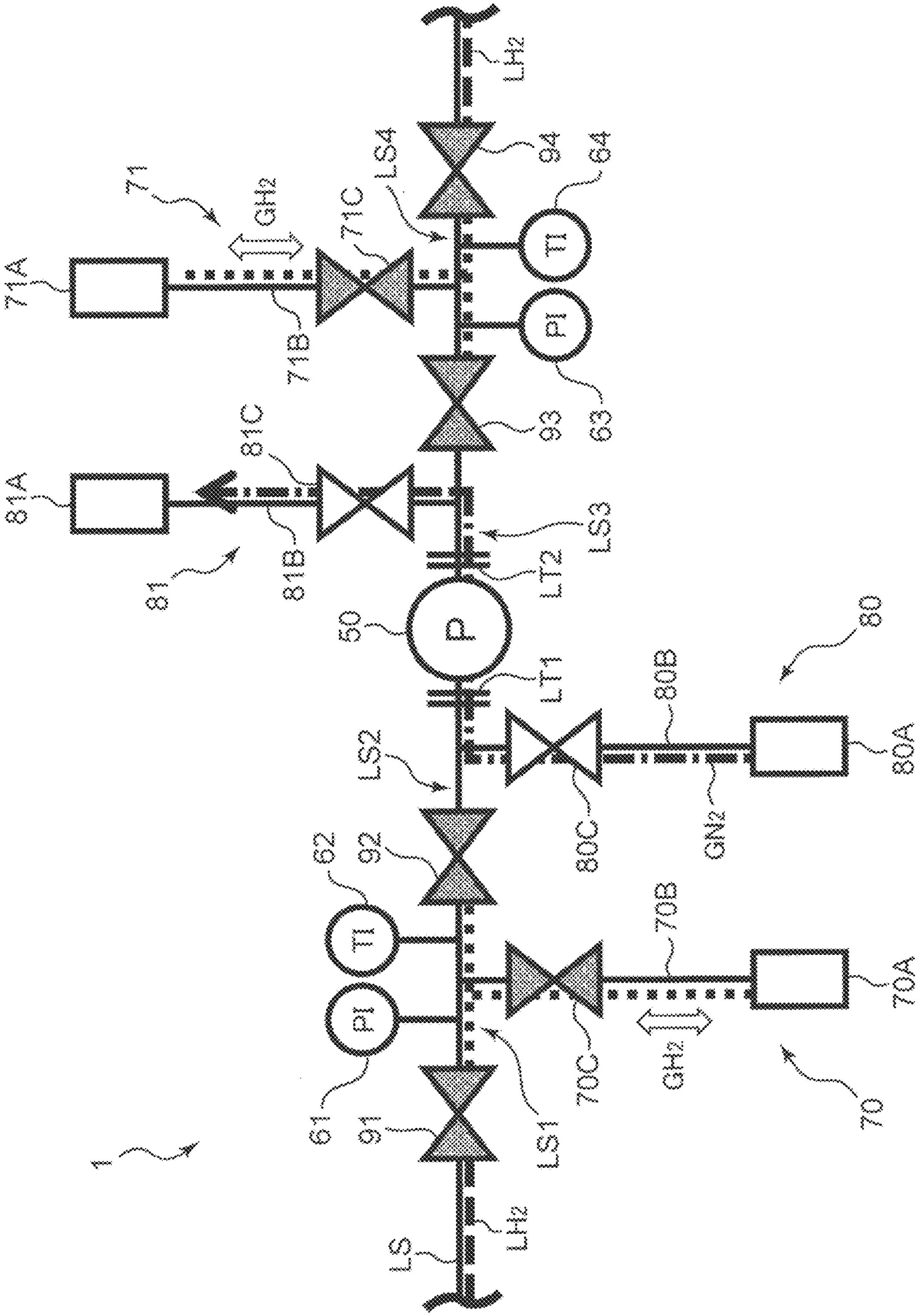
FIG. 5 is an enlarged schematic diagram of the liquefied hydrogen system according to one embodiment of the present disclosure, showing a state in which a part of the flow path is further replaced with nitrogen gas.
Figure 6:
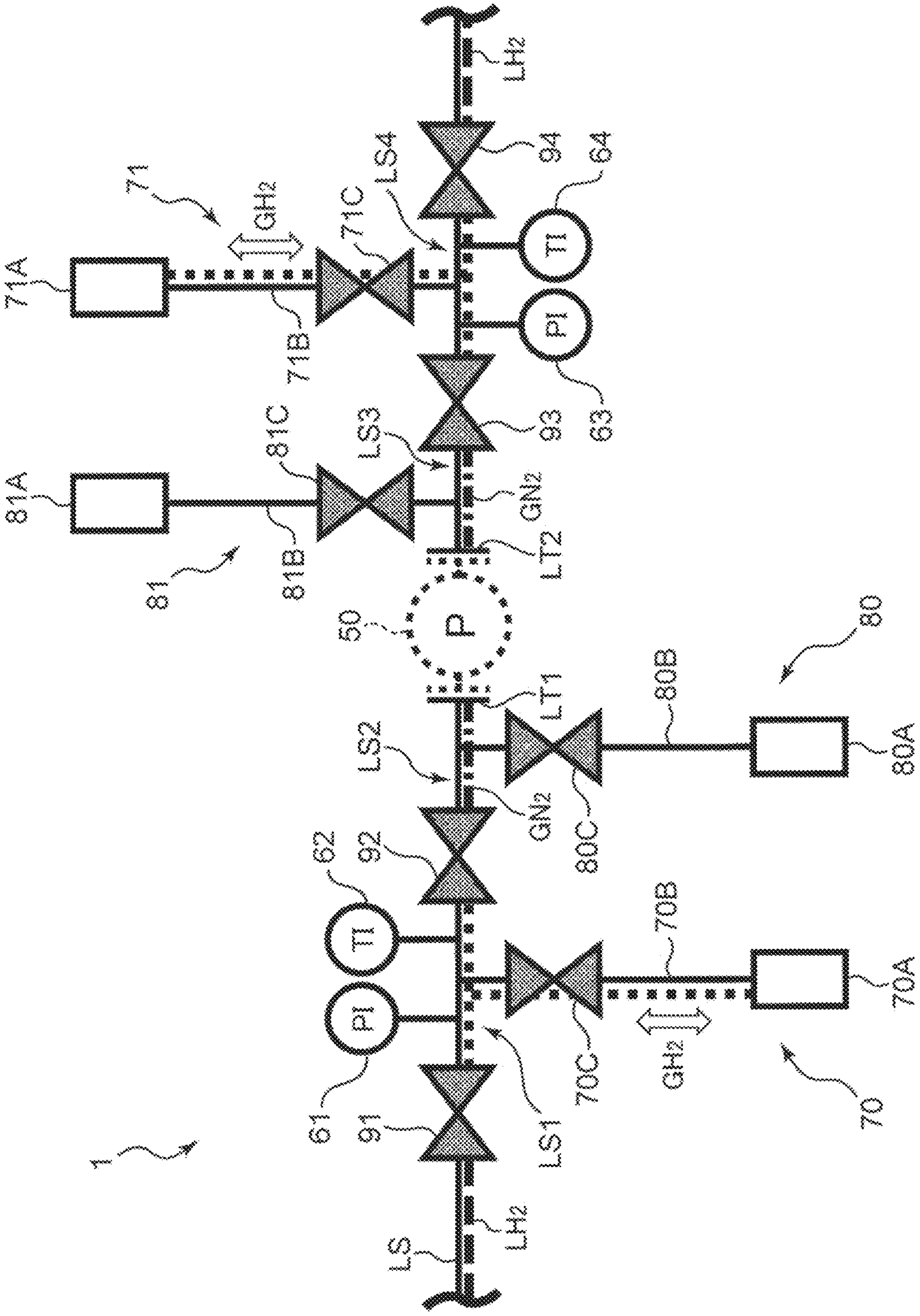
FIG. 6 is an enlarged schematic diagram of the liquefied hydrogen system according to one embodiment of the present disclosure, showing a state in which the equipment is separated from the flow path.

Next, the procedure for detaching the pump 50 from the flow path LS of the liquefied hydrogen system 1S and performing maintenance on the pump 50 will be described with reference to FIGS. 2 to 6. FIG. 3 is a flowchart of the maintenance method for the pump 50. FIG. 4 is an enlarged schematic diagram of the liquefied hydrogen system 1S according to the present embodiment, showing a state in which a part of the flow path LS is replaced with hydrogen gas. Similarly, FIG. 5 is a diagram showing a state in which a part of the flow path LS is further replaced with nitrogen gas. FIG. 6 is a diagram showing a state in which the pump 50 is separated from the flow path LS. Note that in each diagram, the valve painted white means that the valve is open, whereas the valve painted black means that the valve is closed.

As shown in FIG. 2 and step S01 of FIG. 3, when the pump 50 is in an operational state, the first valve 91, the second valve 92, the third valve 93, and the fourth valve 94 are all open, whereas the hydrogen valve 70C, the nitrogen valve 80C, the nitrogen valve 81C, and the hydrogen valve 71C are all closed. In this state, the pump 50 operates to cause liquefied hydrogen to flow through the flow path LS.

When separating the pump 50 from the flow path LS for maintenance of the pump 50, with the flow path LS filled with liquefied hydrogen, as shown in step S02 of FIG. 3 and in FIG. 4, the operator closes the first valve 91 and the fourth valve 94, and opens the hydrogen valve 70C and the hydrogen valve 71C, thereby causing hydrogen gas at room temperature to flow from the hydrogen gas tank 70A into the first section LS1 of the flow path LS. As a result, the hydrogen gas flows into the first section LS1, the second section LS2, the third section LS3, and the fourth section LS4, whereas liquid hydrogen is discharged from the first section LS1, the second section LS2, the third section LS3, and the fourth section LS4 to the hydrogen supply and discharge unit 71. That is, the liquefied hydrogen within the first section LS1 to the fourth section LS4 is replaced with the hydrogen gas at room temperature. After this, the operator closes the hydrogen valve 70C and the hydrogen valve 71C.

Next, in a state where the hydrogen gas has flown into the first section LS1, the second section LS2, the third section LS3, and the fourth section LS4, as shown in step S03 of FIG. 3 and in FIG. 5, the operator closes the second valve 92 and the third valve 93. This results in a state where the first section LS1 and the fourth section LS4 are each filled with the hydrogen gas at room temperature. In this state, the operator opens the nitrogen valve 80C and the nitrogen valve 81C. As a result, the nitrogen gas flows from the nitrogen supply unit 80 into the second section LS2 and the third section LS3, whereas the hydrogen gas is discharged from the second section LS2 and the third section LS3 to the nitrogen discharge unit 81. That is, the hydrogen gas in the second section LS2 and the third section LS3 is replaced with the nitrogen gas. After this, the operator closes the nitrogen valve 80C and the nitrogen valve 81C.

In this way, with the second section LS2 and the third section LS3 filled with the nitrogen gas, as shown in step S04 of FIG. 3 and in FIG. 6, the operator separates the first joint part LT1 and the second joint part LT2 to detach the pump 50 from the flow path LS. At this time, the flow path LS is sealed at each joint, causing the second section LS2 and the third section LS3 to be hermetically sealed in a state filled with the nitrogen gas. As described above, once the pump 50 is separated from the flow path LS, the operator can perform maintenance on the pump 50.

Note that when the maintenance of the pump 50 is completed, the operator reconnects the pump 50 to the flow path LS at the first joint part LT1 and the second joint part LT2. Thereafter, the operator performs the steps in the reverse order of the above detachment process. Specifically, the operator fills the pump 50, the second valve 92, and the third valve 93 with the nitrogen gas to prevent the air and the hydrogen gas from mixing. In more detail, with the second valve 92 and the third valve 93 closed, the operator opens the nitrogen valve 80C and the nitrogen valve 81C, causes the nitrogen gas to flow into the pump 50, the second section LS2, and the third section LS3, and replaces the air with the nitrogen gas. Thereafter, the operator opens the second valve 92 and the third valve 93, thereby causing the hydrogen gas to flow again into the second section LS2 and the third section LS3. Next, the operator opens the first valve 91 and the fourth valve 94, thereby causing the liquefied hydrogen to flow into the first section LS1, the second section LS2, the third section LS3, and the fourth section LS4. As a result, the pump 50 can be operated again. Note that the opening and closing of each valve during the detachment and attachment of the pump 50 may be performed automatically.

As described above, in the present embodiment, along the direction in which the liquefied hydrogen flows from the liquefied hydrogen tank 100 to the hydrogen utilization facility 101 in the flow path LS, the first valve 91, the second valve 92, the first joint part LT1, the pump 50, the second joint part LT2, the third valve 93, and the fourth valve 94 are disposed in this order. When separating the pump 50 from the flow path LS, with the flow path LS filled with the liquefied hydrogen, the operator causes the hydrogen gas to flow into the first section LS1, the second section LS2, the third section LS3, and the fourth section LS4, discharging the liquefied hydrogen. Next, with the hydrogen gas flowing into the first section LS1, the second section LS2, the third section LS3, and the fourth section LS4, the operator causes the nitrogen gas to flow into the second section LS2 and the third section LS3, discharging the hydrogen gas. Furthermore, with the nitrogen gas flowing into the second section LS2 and the third section LS3, the operator decouples and seals the flow path LS with the first joint part LT1 and the second joint part LT2, separating the pump 50.

By such a method, the pump 50 can be safely detached from the flow path LS with the pump 50 filled with the nitrogen gas. The melting point of nitrogen gas is −210° C., making the nitrogen gas easier to solidify when exposed to the cold energy of the liquefied hydrogen at −253° C. However, in the present embodiment, even with the liquefied hydrogen filled on the liquefied hydrogen tank 100 side of the first valve 91 and on the hydrogen utilization facility 101 side of the fourth valve 94, the first section LS1 and the fourth section LS4 are filled with hydrogen gas, making it possible to prevent the cold energy of the liquefied hydrogen at approximately −253° C. from being transmitted to the nitrogen gas in the second section LS2 and the third section LS3. That is, the first section LS1 and the fourth section LS4 can each function as a temperature buffer. As a result, it is possible to prevent damage to the valves and flow paths caused by the nitrogen gas solidifying in the valves and flow paths due to the cold energy of the liquefied hydrogen being transferred to the nitrogen gas. Therefore, the pump 50 can be detached from the flow path LS for maintenance or other purposes by using the nitrogen gas, which is cheaper than helium, which is generally used as an inert gas. Therefore, maintenance of the pump 50 can be performed without being affected by the supply amount of helium gas. As a result, the maintenance cost of the liquefied hydrogen system 1S can also be reduced. After the maintenance, the operation of the pump 50 can be quickly resumed by flowing the liquefied hydrogen again into the limited area from the first valve 91 to the fourth valve 94.

In the present embodiment, when filling the hydrogen gas between the first valve 91 and the fourth valve 94 of the flow path LS, the operator closes the first valve 91 and the fourth valve 94 and introduces the hydrogen gas between the first valve 91 and the fourth valve 94, thereby discharging the liquefied hydrogen. Therefore, the hydrogen gas filling operation and the liquefied hydrogen discharge operation can be performed efficiently while the liquefied hydrogen is pushed out by the hydrogen gas. Similarly, when filling the nitrogen gas between the second valve 92 and the third valve 93 of the flow path LS, the operator closes the second valve 92 and the third valve 93 and introduces the nitrogen gas between the second valve 92 and the third valve 93, thereby discharging the hydrogen gas. In this case as well, the nitrogen gas filling operation and the hydrogen gas discharge operation can be performed efficiently while the hydrogen gas is pushed out by the nitrogen gas.

Furthermore, in the present embodiment, the nitrogen supply unit 80 for supplying the nitrogen gas to the second section LS2 and the third section LS3 communicates directly with the second section LS2 of the flow path LS. Therefore, compared with the case where the nitrogen gas is supplied to the second section LS2 and the third section LS3 via the first section LS1 and the fourth section LS4, the nitrogen gas does not remain in the first section LS1 and the fourth section LS4, preventing the remaining nitrogen gas from solidifying. With such a configuration, it is also possible to prevent the hydrogen gas from leaking from the first section LS1 and the fourth section LS4 serving as temperature buffers into the atmosphere and to prevent air from entering the temperature buffers.

Note that in FIGS. 5 and 6, with the first section LS1 filled with the hydrogen gas, the operator can adjust the opening and closing of the hydrogen valve 70C according to detection results of the pressure gauge 61 and the thermometer 62 to adjust the amount of hydrogen gas filled in the first section LS1. Similarly, with the fourth section LS4 filled with the hydrogen gas, the operator can adjust the opening and closing of the hydrogen valve 70C according to detection results of the pressure gauge 63 and the thermometer 64 to adjust the amount of hydrogen gas filled in the fourth section LS4. In each of the above adjustment operations, the operator may adjust the amount of hydrogen gas filled according to the detection result of one of temperature and pressure.

The above adjustment operation will be specifically described using the first section LS1 in FIG. 6 as an example. In the first section LS1, the hydrogen gas tends to contract due to the propagation of cold energy from the liquefied hydrogen, causing a drop in pressure. If the pressure in the first section LS1 is left lowered in this manner, due to the pressure difference between the first section LS1 and the second section LS2, there is a possibility that the nitrogen gas may flow into the first section LS1 through the second valve 92 and solidify within the first section LS1 due to the cold energy of the liquefied hydrogen. In the present embodiment, to prevent such problems, when the pressure in the first section LS1 drops, the operator can supply the hydrogen gas from the hydrogen supply and discharge unit 70 to keep the pressure in the first section LS1.

Meanwhile, when the temperature of the first section LS1 drops significantly, there is a possibility that nitrogen may liquefy or solidify between the second valve 92 and the first joint part LT1. If the nitrogen gas liquefies in this way, there is a possibility that the occurrence of negative pressure may cause the hydrogen gas to leak from the first section LS1 to the second section LS2. When the hydrogen gas leaking into the second section LS2 vaporizes again due to heat input from the atmosphere, there is a possibility that this pressure may increase and the hydrogen gas may leak further into the atmosphere. In the present embodiment, when the temperature in the first section LS1 drops, the operator can operate the hydrogen supply and discharge unit 70 to raise the temperature of the first section LS1 by repeatedly supplying and discharging the hydrogen gas. As one example, by increasing the supply amount of the hydrogen gas to the first section LS1, the operator raises the temperature of the first section LS1. When the pressure increases accordingly, a small amount of hydrogen gas is discharged from the first section LS1, thereby allowing the pressure in the first section LS1 to be adjusted. Note that the measurement instruments such as the pressure gauge 61 and the thermometer 62 are not essential in the present disclosure. The above adjustment operation may be performed automatically.

In the present embodiment, as shown in FIG. 4, when filling the hydrogen gas between the first valve 91 and the fourth valve 94, the operator introduces the hydrogen gas between the first valve 91 and the second valve 92, and discharges the liquefied hydrogen from between the third valve 93 and the fourth valve 94. This allows the hydrogen gas to be efficiently filled between the first valve 91 and the fourth valve 94 by using the pump 50 as the flow path for the hydrogen gas.

Similarly, in the present embodiment, as shown in FIG. 5, when filling the nitrogen gas between the second valve 92 and the third valve 93, the operator introduces the nitrogen gas between the second valve 92 and the pump 50, and discharges the hydrogen gas from between the pump 50 and the third valve 93. This allows the nitrogen gas to be efficiently filled between the second valve 92 and the third valve 93 by using the pump 50 as the flow path for the nitrogen gas. Through this operation, the pump 50 can be filled with the nitrogen gas, allowing the pump 50 to be safely detached.

Note that when the pump 50 is separated from the flow path LS as equipment that handles liquefied hydrogen as in the present embodiment, the maintenance may take several days. Even in such a case, in the present embodiment, since the pumps 50 are disposed in parallel as shown in FIG. 1, during maintenance of one pump, the other pump can be kept functioning, allowing the transport of liquefied hydrogen to continue. As described above, even if the pump 50 is separated from the flow path LS for an extended period of time, the operator can adjust the amount of hydrogen gas filled in the first section LS1 and the fourth section LS4, making it possible to stably suppress cold energy from being transmitted to the nitrogen gas in the second section LS2 and the third section LS3 for an extended period of maintenance.

Modified Embodiment

The equipment maintenance method according to the present disclosure has been described above, but the present disclosure is in no way limited to the above-described embodiment. For example, the above-described equipment maintenance method can have the following modified embodiment.

The above embodiment has been described according to an aspect in which the valves are disposed in order along the direction in which the liquefied hydrogen flows from the liquefied hydrogen tank 100 to the hydrogen utilization facility 101. However, the direction in which the liquefied hydrogen flows may be the direction from the hydrogen utilization facility 101 to the liquefied hydrogen tank 100. In this case, the first valve 91, the second valve 92, the first joint part LT1, the pump 50, the second joint part LT2, the third valve 93, and the fourth valve 94 need to be disposed in order from the hydrogen utilization facility 101 to the liquefied hydrogen tank 100.

The above embodiment has been described according to an aspect in which each of the hydrogen gas and the nitrogen gas flows through the pump 50 from the second valve 92 side to the third valve 93 side, but the present disclosure is not limited to this aspect. The attachment and detachment mechanism 1 may include its own supply and discharge passages for the hydrogen gas and the nitrogen gas on both sides of the pump 50.

Figure 7:
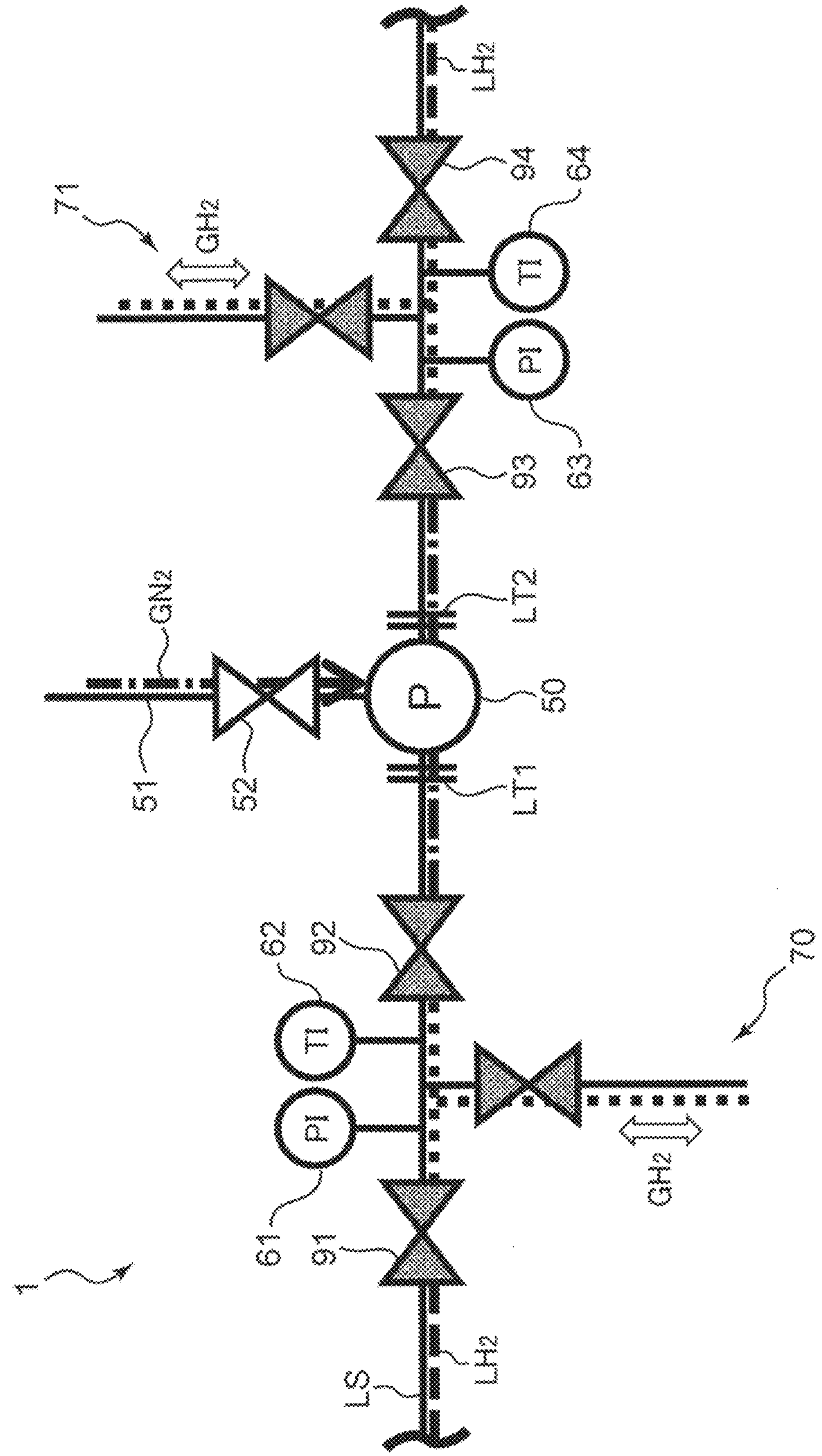
FIG. 7 is an enlarged schematic diagram of the liquefied hydrogen system according to a first modified embodiment of the present disclosure, showing a state in which a part of the flow path is replaced with hydrogen gas and nitrogen gas.

FIG. 7 is an enlarged schematic diagram of the liquefied hydrogen system according to a first modified embodiment of the present disclosure, showing a state in which a part of the flow path LS is filled with hydrogen gas and nitrogen gas. The modified embodiment, which differs from the above embodiment in the supply route for the nitrogen gas to the flow path LS, will describe mainly this difference.

The liquefied hydrogen system 1S includes a seal gas flow path 51 and a valve 52, instead of the nitrogen supply unit 80 and the nitrogen discharge unit 81 according to the above embodiment. The seal gas flow path 51 supplies a seal gas including nitrogen to a gap within the pump 50 to prevent leakage of the liquefied hydrogen within the pump 50. The operator can supply the above-described nitrogen gas to the flow path LS by switching the opening and closing of the valve 52.

In this modified embodiment, as in the above embodiment, with the hydrogen gas filled between the first valve 91 and the fourth valve 94, when the operator closes the second valve 92 and the third valve 93 and opens the valve 52, the nitrogen gas flows from the pump 50 into the flow path between the second valve 92 and the third valve 93. At this time, the hydrogen gas is discharged from a discharge flow path (not shown). Thereafter, as in the above embodiment, the operator can separate the flow path LS at the first joint part LT1 and the second joint part LT2, and detach the pump 50. With such a configuration as well, the pump 50 can be safely detached from the flow path LS while preventing the nitrogen gas from solidifying. In this way, the supply source of the nitrogen gas in the present disclosure may also be the pump 50.

Figure 8:
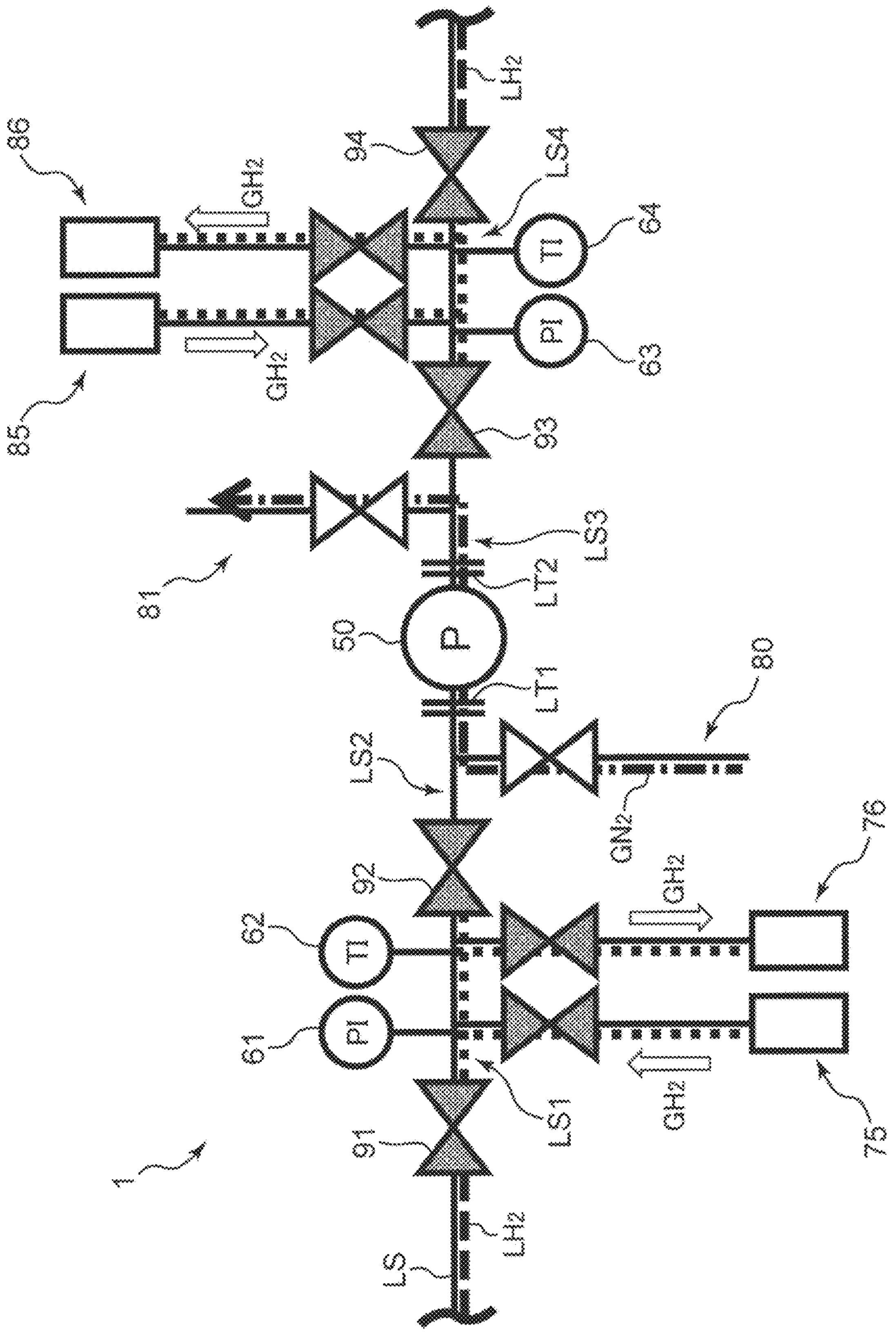
FIG. 8 is an enlarged schematic diagram of the liquefied hydrogen system according to a second modified embodiment of the present disclosure, showing a state in which a part of the flow path is replaced with hydrogen gas and nitrogen gas.

FIG. 8 is an enlarged schematic diagram of the liquefied hydrogen system according to a second modified embodiment of the present disclosure, showing a state in which a part of the flow path LS is filled with hydrogen gas and nitrogen gas. The above embodiment has been described according to an aspect in which the hydrogen supply and discharge unit 70 that communicates with the first section LS1 and the hydrogen supply and discharge unit 71 that communicates with the fourth section LS4 each supply and discharge the hydrogen gas via one passage. However, as shown in FIG. 8, the supply passage and discharge passage for the hydrogen gas may be provided independently.

Specifically, the attachment and detachment mechanism 1 includes a hydrogen supply unit 75 and an adjustment hydrogen discharge unit 76. The hydrogen supply unit 75 has a function of supplying the hydrogen gas to the section from the first valve 91 to the fourth valve 94. The hydrogen supply unit 75 has a function of adjusting the amount of hydrogen gas filled in the first section LS1 by supplying the hydrogen gas to the first section LS1 after the second valve 92 is closed. The adjustment hydrogen discharge unit 76 has a function of adjusting the amount of hydrogen gas filled in the first section LS1 by discharging the hydrogen gas from the first section LS1 after the second valve 92 is closed.

Similarly, the attachment and detachment mechanism 1 includes an adjustment hydrogen supply unit 85 and a hydrogen discharge unit 86. The hydrogen discharge unit 86 has a function of accepting the liquefied hydrogen and the hydrogen gas from the section from the first valve 91 to the fourth valve 94. The hydrogen discharge unit 86 has a function of adjusting the amount of hydrogen filled in the fourth section LS4 by accepting the hydrogen gas from the fourth section LS4 after the third valve 93 is closed. The adjustment hydrogen supply unit 85 has a function of adjusting the amount of hydrogen gas filled in the fourth section LS4 by supplying the hydrogen gas to the fourth section LS4 after the third valve 93 is closed.

In the above configuration as well, the operator can adjust the supply amount of hydrogen gas supplied from the hydrogen supply unit 75 and the discharge amount of hydrogen gas discharged from the adjustment hydrogen discharge unit 76 according to the detection results of the pressure gauge 61 and the thermometer 62. The operator can adjust the supply amount of hydrogen gas supplied from the adjustment hydrogen supply unit 85 and the discharge amount of hydrogen gas discharged from the hydrogen discharge unit 86 according to the detection results of the pressure gauge 63 and the thermometer 64. In particular, when the pressure gauge 61 or the thermometer 62 detects that the pressure or temperature of the hydrogen gas has dropped, the operator preferably increases the supply amount of hydrogen gas supplied from the hydrogen supply unit 75. The same applies to the adjustment hydrogen supply unit 85.

CONCLUSION OF PRESENT DISCLOSURE

The specific embodiment described above includes the disclosure having the following configuration.

An equipment maintenance method according to one aspect of the present disclosure is an equipment maintenance method in a flow path having a first valve, a second valve, equipment, a third valve, and a fourth valve disposed in order along a direction in which liquefied hydrogen flows, and includes: filling hydrogen gas between the first valve and the fourth valve in the flow path; filling nitrogen gas between the second valve and the third valve in the flow path from a state where the hydrogen gas is filled between the first valve and the fourth valve in the flow path; and decoupling and sealing the flow path between the second valve and the equipment and between the third valve and the equipment, and separating the equipment from the flow path with the nitrogen gas filled between the second valve and the third valve in the flow path.

By this method, from the state where the liquefied hydrogen is filled on the flow path, after the hydrogen gas is filled between the first valve and the fourth valve, with the nitrogen gas filled between the second valve and the third valve, by decoupling the flow path between the second valve and the equipment in the flow path and between the third valve and the equipment, the equipment maintenance can be safely performed. As a result, after the maintenance, the operation of the equipment can be quickly resumed by flowing the liquefied hydrogen again into the limited area from the first valve to the fourth valve. The hydrogen gas filled between the first valve and the second valve and between the third valve and the fourth valve functions as a temperature buffer, thereby preventing the cold energy of the liquefied hydrogen from being transmitted to the nitrogen gas during the equipment maintenance and the nitrogen gas from solidifying.

The above method may further include closing the first valve and the fourth valve when filling the hydrogen gas between the first valve and the fourth valve in the flow path, and discharging the liquefied hydrogen by introducing the hydrogen gas between the first valve and the fourth valve.

By this method, the filling operation of the hydrogen gas and the discharging operation of the liquefied hydrogen can be performed efficiently.

The above method may further include closing the second valve and the third valve when filling the nitrogen gas between the second valve and the third valve in the flow path, and discharging the hydrogen gas by introducing the nitrogen gas between the second valve and the third valve.

By this method, the filling operation of nitrogen gas and the discharge operation of hydrogen gas can be performed efficiently.

The above method may further include introducing the hydrogen gas between the first valve and the second valve when filling the hydrogen gas between the first valve and the fourth valve in the flow path, and discharging the liquefied hydrogen from between the third valve and the fourth valve.

By this method, the hydrogen gas can be efficiently filled between the first valve and the fourth valve by using the equipment as the flow path for the hydrogen gas.

The above method may further include introducing the nitrogen gas between the second valve and the equipment when filling the nitrogen gas between the second valve and the third valve in the flow path, and discharging the hydrogen gas from between the equipment and the third valve.

By this method, the nitrogen gas can be efficiently filled in the section from the second valve to the third valve by using the equipment as the flow path for the nitrogen gas. Through this operation, the interior of the equipment can be filled with the nitrogen gas, allowing the equipment to be safely detached.

The above method may further include detecting temperature and pressure between the first valve and the second valve or between the third valve and the fourth valve with the equipment separated from the flow path, and adjusting an amount of the hydrogen gas filled according to a detection result of at least one of the temperature and the pressure.

By this method, even if the temperature or pressure of the filled hydrogen gas fluctuates during the equipment maintenance, by adjusting the amount of hydrogen gas filled, the temperature balance of the liquefied hydrogen, the hydrogen gas, and the nitrogen gas can be maintained stably.

The above method may further include increasing the amount of hydrogen gas filled when a drop in the temperature or the pressure between the first valve and the second valve or between the third valve and the fourth valve is detected.

By this method, even if the temperature or pressure of the filled hydrogen gas drops during the equipment maintenance, by increasing the amount of hydrogen gas filled, the temperature balance of the liquefied hydrogen, the hydrogen gas, and the nitrogen gas can be maintained further stably.

The invention claimed is:

1. An equipment maintenance method in a flow path having a first valve, a second valve, equipment, a third valve, and a fourth valve disposed in order along a direction in which liquefied hydrogen flows, the method comprising:

filling hydrogen gas between the first valve and the fourth valve in the flow path;

filling nitrogen gas between the second valve and the third valve in the flow path from a state where the hydrogen gas is filled between the first valve and the fourth valve in the flow path; and decoupling and sealing the flow path between the second valve and the equipment and between the third valve and the equipment, and separating the equipment from the flow path with the nitrogen gas filled between the second valve and the third valve in the flow path.

2. The equipment maintenance method according to claim 1, further comprising closing the first valve and the fourth valve when filling the hydrogen gas between the first valve and the fourth valve in the flow path, and discharging the liquefied hydrogen by introducing the hydrogen gas between the first valve and the fourth valve.

3. The equipment maintenance method according to claim 2, further comprising introducing the hydrogen gas between the first valve and the second valve when filling the hydrogen gas between the first valve and the fourth valve in the flow path, and discharging the liquefied hydrogen from between the third valve and the fourth valve.

4. The equipment maintenance method according to claim 1, further comprising closing the second valve and the third valve when filling the nitrogen gas between the second valve and the third valve in the flow path, and discharging the hydrogen gas by introducing the nitrogen gas between the second valve and the third valve.

5. The equipment maintenance method according to claim 4, further comprising introducing the nitrogen gas between the second valve and the equipment when filling the nitrogen gas between the second valve and the third valve in the flow path, and discharging the hydrogen gas from between the equipment and the third valve.

6. The equipment maintenance method according to claim 1, further comprising detecting at least one of temperature and pressure between the first valve and the second valve or between the third valve and the fourth valve with the equipment separated from the flow path, and adjusting an amount of the hydrogen gas filled according to a detection result of at least one of the temperature and the pressure.

7. The equipment maintenance method according to claim 6, further comprising increasing the amount of hydrogen gas filled when a drop in the temperature or the pressure between the first valve and the second valve or between the third valve and the fourth valve is detected.

8. A liquefied hydrogen system, comprising:

a flow path through which liquefied hydrogen flows;

a first valve, a second valve, equipment, a third valve, and a fourth valve disposed in order along a direction in which the liquefied hydrogen flows;

a first receiving unit that receives the liquefied hydrogen in an area of the flow path between the first valve and the fourth valve;

a first filling unit that fills the area of the flow path between the first valve and the fourth valve with hydrogen gas;

a second receiving unit that receives hydrogen gas in an area of the flow path between the second valve and the third valve;

a second filling unit that fills the area of the flow path between the second valve and the third valve with nitrogen gas;

a separating mechanism that decouples and seals the flow path between the second valve and the equipment and between the third valve and the equipment.

9. The liquefied hydrogen system according to claim 8, wherein the first filling unit introduces the hydrogen gas into the area between the first valve and the fourth valve in a state where the first valve and the fourth valve are closed to push out the liquefied hydrogen from the area, and the first receiving unit receives the pushed out liquefied hydrogen.

10. The liquefied hydrogen system according to claim 9, wherein the first filling unit communicates with a section of the flow path between the first valve and the second valve, and the first receiving unit communicates with a section of the flow path between the third valve and the fourth valve.

11. The liquefied hydrogen system according to claim 8, wherein the second filling unit introduces the nitrogen gas into the area between the second valve and the third valve in a state where the second valve and the third valve are closed to push out the hydrogen gas from the area, and the second receiving unit receives the pushed out hydrogen gas.

12. The liquefied hydrogen system according to claim 11, wherein the second filling unit communicates with a section of the flow path between the second valve and the equipment, and the second receiving unit communicates with a section of the flow path between the equipment and the third valve.

13. The liquefied hydrogen system according to claim 8, further comprising:

a detector that detects at least one of temperature and pressure between the first valve and the second valve or between the third valve and the fourth valve; and an adjustor that adjusts an amount of the hydrogen gas filled in the flow path according to a detection result of the at least one of temperature and pressure.

14. The liquefied hydrogen system according to claim 13, wherein the adjustor increases the amount of hydrogen gas filled when a drop in the temperature or the pressure between the first valve and the second valve or between the third valve and the fourth valve is detected.

* * * * *